United States Patent [19]
Boone et al.

[11] 3,845,825
[45] Nov. 5, 1974

[54] MULTIPLE-GANG DISC-TYPE GROUND TILLAGE IMPLEMENT

[75] Inventors: James A. Boone, Quinter; Harold G. Walker, Wakeeney; Galen R. Huffman, Quinter, all of Kans.

[73] Assignee: Ideal Industries Incorporated, Quinter, Kans.

[22] Filed: Jan. 15, 1973

[21] Appl. No.: 323,839

[52] U.S. Cl.............. 172/158, 172/314, 172/579, 172/595
[51] Int. Cl............................................. A01b 5/06
[58] Field of Search .......... 172/158, 184, 185, 187, 172/314, 328, 567, 578–580, 583, 587, 595; 280/411–413

[56] References Cited
UNITED STATES PATENTS

| | | | |
|---|---|---|---|
| 1,894,474 | 1/1933 | Sckowska | 172/567 |
| 2,577,993 | 12/1951 | Baccei et al. | 172/595 X |
| 2,606,415 | 8/1952 | Gerber | 172/595 X |
| 2,908,336 | 10/1959 | Smith | 172/587 X |
| 3,213,946 | 10/1965 | Carrick | 172/583 X |
| 3,516,499 | 6/1970 | Johnson | 172/579 X |
| 3,708,018 | 1/1973 | Wilbeck | 172/328 X |
| 3,734,199 | 5/1973 | Tsuchiya et al. | 172/587 X |

Primary Examiner—Robert E. Pulfrey
Assistant Examiner—Paul T. Sewell
Attorney, Agent, or Firm—Edwards, Spangler, Wymore & Klaas

[57] ABSTRACT

This invention relates to a ground tillage implement characterized by a tractor-drawn wheeled-carriage defining an overhead frame having a pair of dissimilar disc subsassemblies hingedly suspended from the underside thereof in rearwardly offset side-by-side relation to one another for tiltable movement about transversely spaced parallel axes extending longitudinally along their respective center lines. The diagonally disposed lead gangs of the disc subassemblies occupy a rearwardly offset parallel relation to one another in which the rear gang of the parallel pair thus produced has its inboard extremity tapered and of a length adapted to overlap the path already plowed by the adjacent end of the front gang. The front and rear disc subassemblies are operatively linked together across the subframes forming a part thereof in a manner to minimize uneven penetration. The support wheels of the carriage are disposed within the front and rear disc subassemblies such that they occupy like positioned relative to the leading and trailing gangs thereof. A pair of throw-back discs are interposed between the lead gangs of the disc subassemblies positioned and adapted to shift the ridge produced by the inboard end in the lead gang of the front disc subassembly back to a position where it will be engaged by the trailing gang of the same subassembly and before the full sized discs of a parallel gang can move it even farther aside.

17 Claims, 18 Drawing Figures

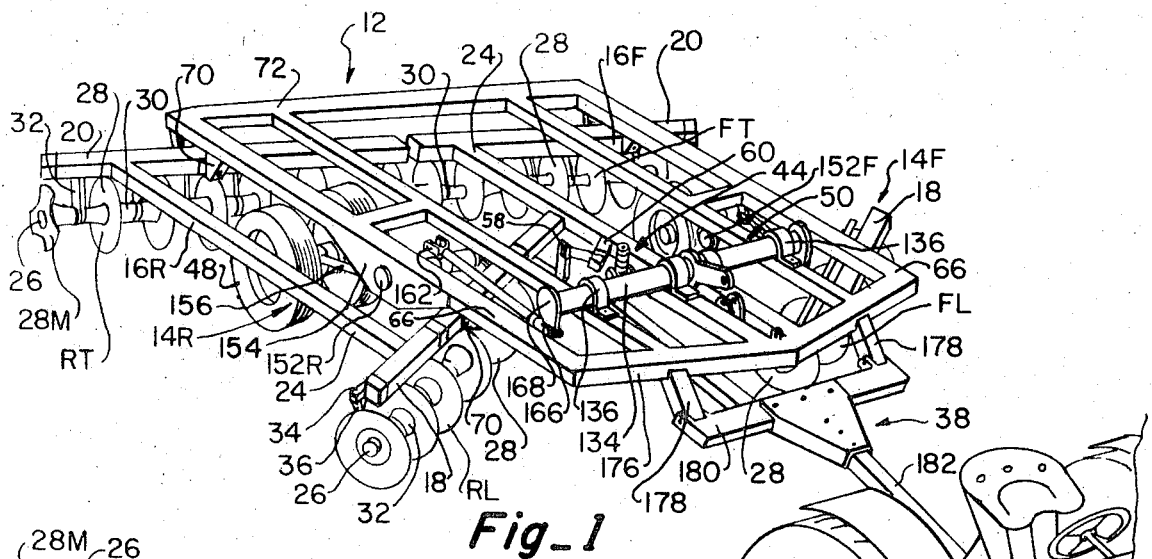
Fig_1
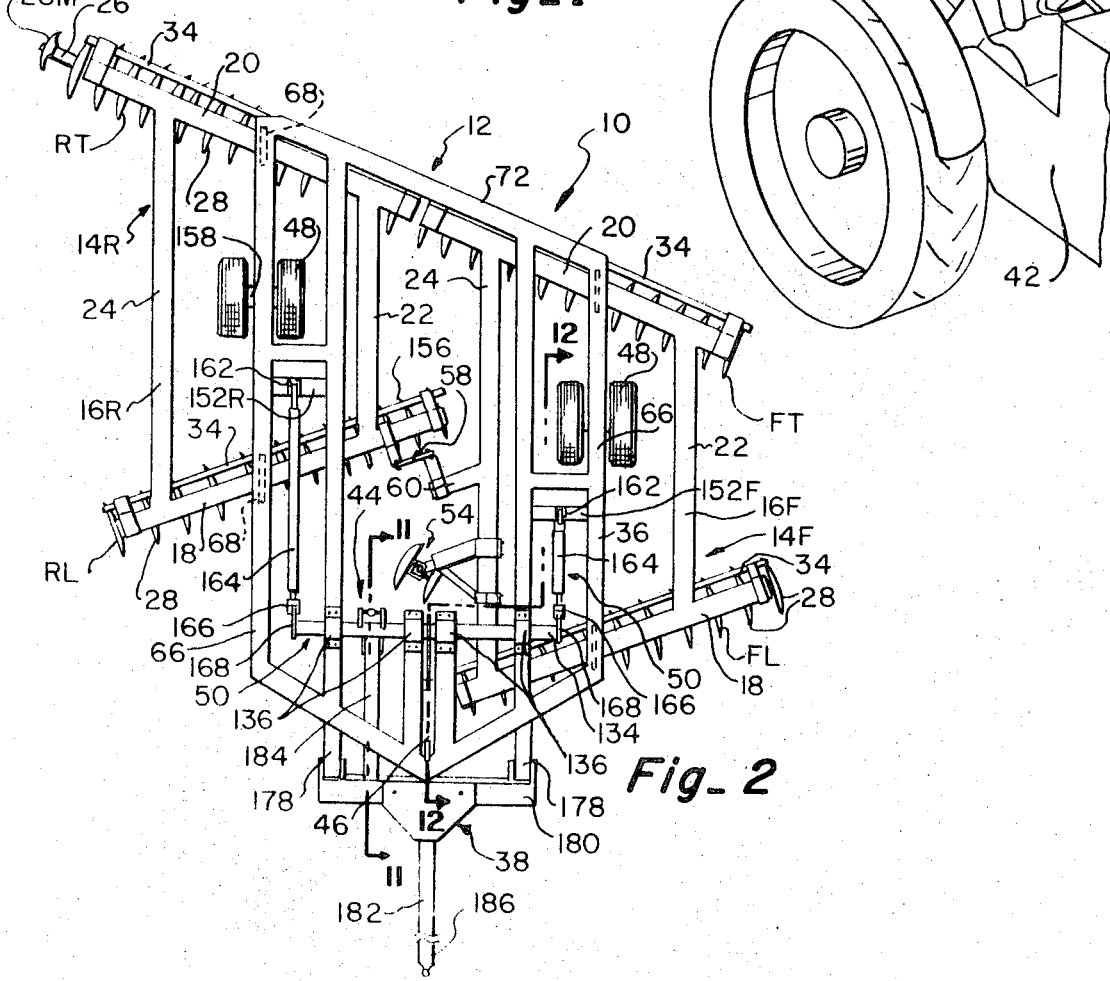
Fig_2

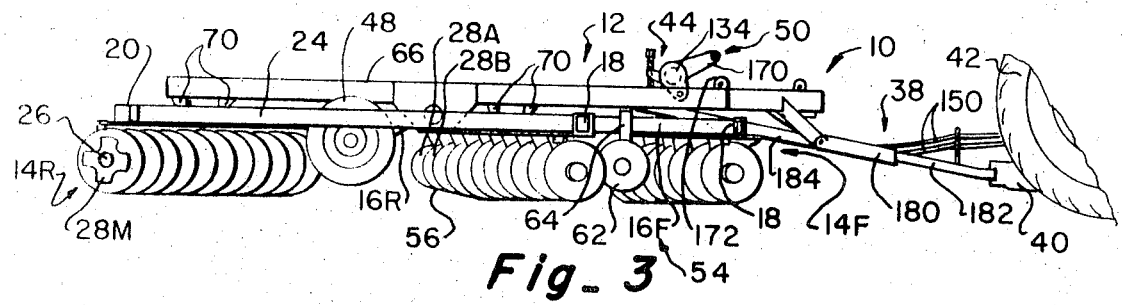
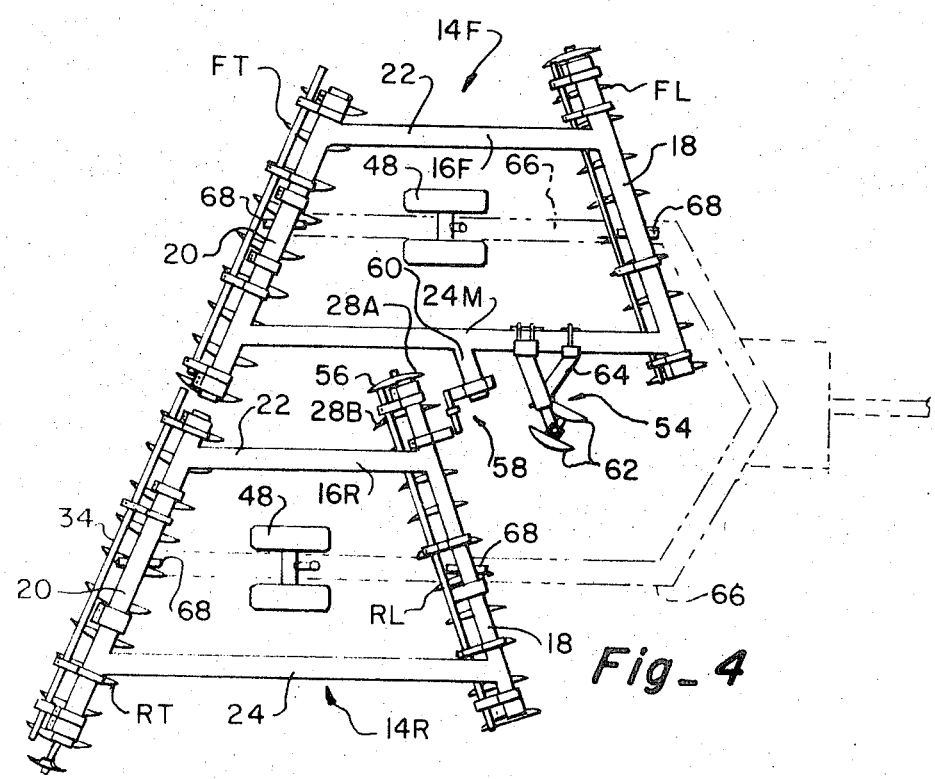
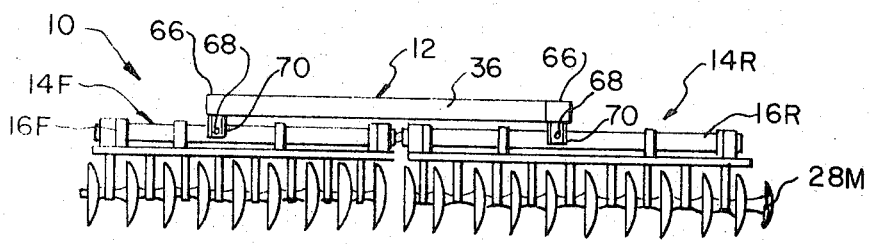
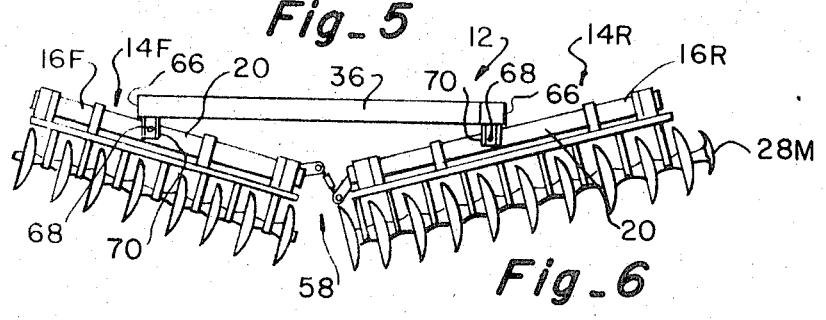

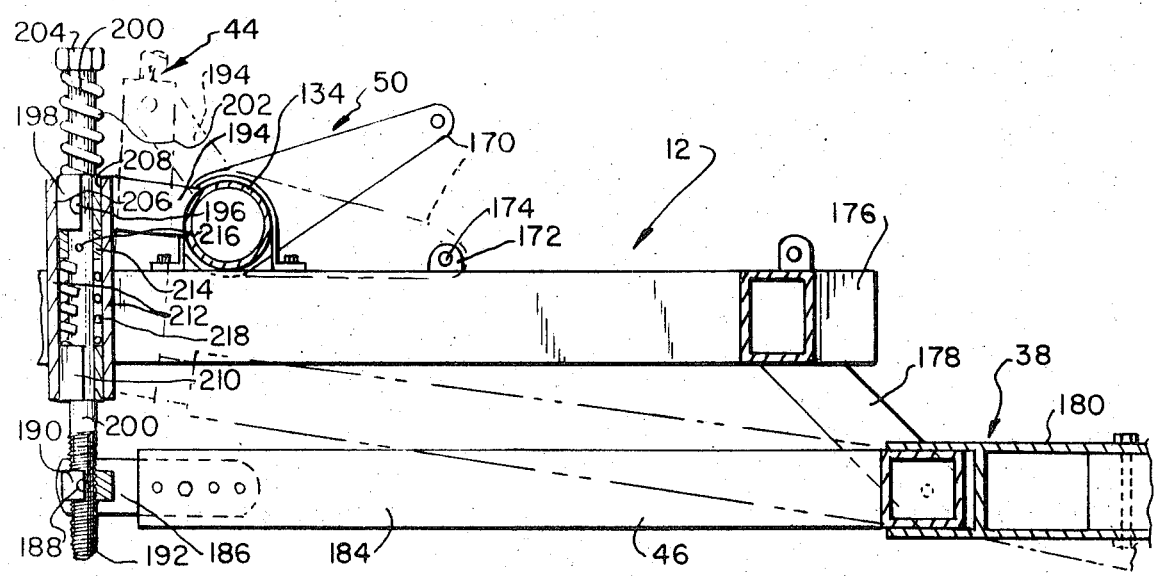
Fig_11
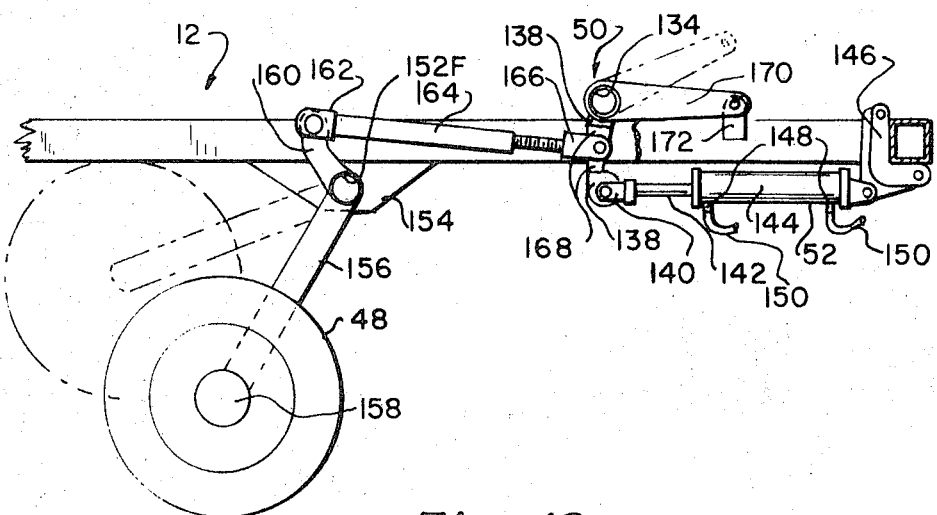
Fig_12

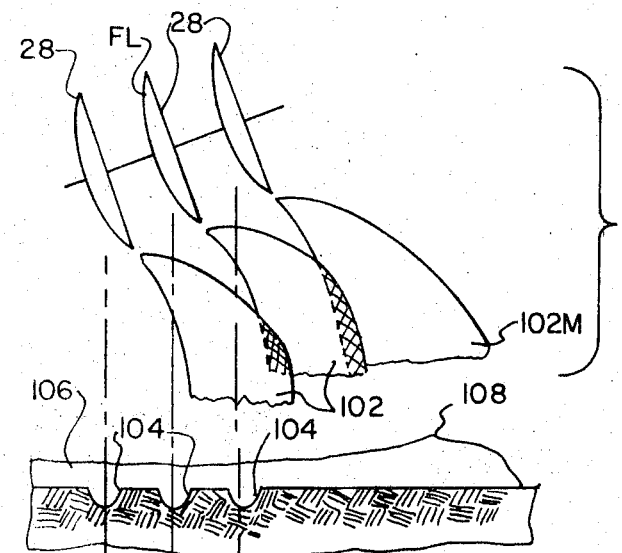
Fig. 13
Fig. 14
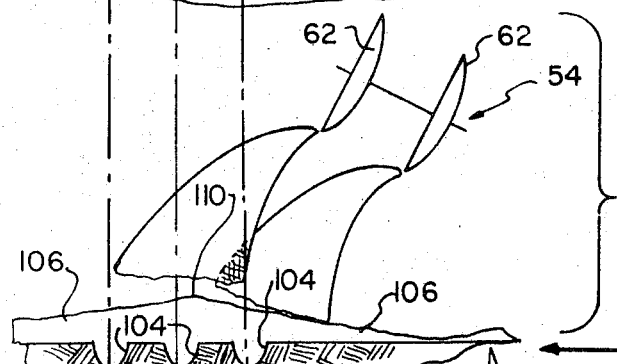
Fig. 15
Fig. 16
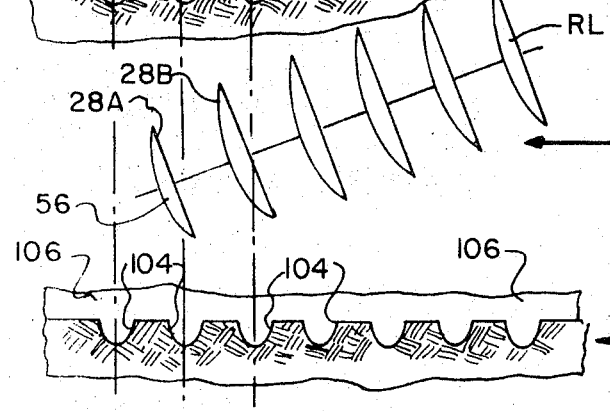
Fig. 17
Fig. 18

MULTIPLE-GANG DISC-TYPE GROUND TILLAGE IMPLEMENT

The conventional disc-type multiple-gang ground tillage implement has its disc subassemblies suspended from the main frame forming a part of the wheeled carriage at their adjacent ends for pivotal movement about a common longitudinally extending centrally located axis. With such a configuration, poor ground penetration is achieved at the outboard ends of the disc gangs when plowing along a ridge or other crowned surface. Conversely, when plowing a trough, a gap appears between the inboard discs of adjacent gangs that results in a ridge of soil being thrown up.

The first of these problems, i.e., that of achieving good penetration with the outboard ends of the disc gangs is solved quite satisfactorily by hinging the gangs at their midpoints rather than at their adjacent ends; however, unfortunately, the ridging problem associated with plowing concave surfaces becomes more pronounced because the adjacent gang ends are free to separate and they do so to a considerable degree.

In order to properly work the soil it becomes necessary, of course, to angle the disc gangs relative to the direction of travel, as the lead gang passes over the ground, its discs produce a series of parallel furrows separated from one another by a narrow ridge of untilled soil. The trailing gang of the same disc subassembly is oppositely inclined relative to the lead gang thereof and its discs face in the opposite direction in addition to being positioned to plow away the ridges left untilled between the furrows. Theoretically, at least, this arrangement is designed to till all of the soil in the path of the implement and leave the surface relatively level after having thrown the dirt dug out of the furrows by the lead gang to one side a few inches preparatory to returning it to essentially its original position by the trailing gang. Unfortunately, in actual operation, this seldom, if ever, occurs.

To begin with, the disc spacing within a given gang is such that the "rooster-tail" of plowed soil being thrown up by the trailing edge of each disc is partially deflected by the corresponding tail of the disc immediately ahead thereof except for the front disc in each gang. The latter, unfortunately, throws up a ridge of undeflected soil that lies farther out than the rest and which is oftentimes somewhat higher than usual. Now, the resulting ridge is missed by the trailing gang of the same disc subassembly due to its greater lateral displacement. The net result is that the laterally displaced ridge is ultimately engaged by the discs of a gang having the same inclination as the one that made it in the first place thus causing a permanent lateral displacement of the soil that produces a wide shallow trough or furrow terminating in a gentle ridge at its remote extremity instead of the desired level surface condition. The similarly inclined gang that next engages the laterally displaced ridge may, of course, be another gang of the same implement trailing therebehind that forms part of a second trailing disc subassembly or a gang that passes thereover on a subsequent pass including the gang that made it in the first place.

Another problem associated with the divergent angular relation of the lead and trailing gangs of a single disc subassembly is the well recognized fact that the front end of each gang has a pronounced tendency to penetrate the soil more deeply than the rear end thereof which attempts to roll up onto the surface. This, of course, results in both incomplete tillage and an uneven field.

One well known design quite commonly found in disc-type tillage implements is that of arranging all the discs on a pair of angularly disposed divergent supporting shafts so as to define long inclined and unarticulated front and rear gangs supported by a pair of carriage wheels positioned in transversely spaced relation along the bisector. The resulting structure is difficult to control for the reason that as the front end of the implement is raised and lowered in an attempt to vary the degree of disc penetration into the soil, a disproportionate degree of movement occurs at the widely spaced ends in comparison with the closely spaced ones. For instance, a slight elevation of the tongue of the implement located approximately midway between its ends results in the front disc of the lead gang raising up a good deal higher than the rear disc thereof while, at the same time, the rear disc of the trailing gang is forced deeply into the ground. Thus, in anything but a level condition, the closely spaced corners of the gangs exhibit considerably less displacement than the widely spaced ones. Relocating the carriage wheels so that they turn about axes located the same distance from at least one of the two divergent gangs further complicates the problem as the wheel positioned the farthest from the apex of the angle defined thereby ends up even farther away from the other gang.

It has now been found in accordance with the teaching of the instant invention that these and other shortcomings of the prior art disc-type ground tillage implements can, in fact, be overcome by, first of all, hingedly suspending the two disc subassemblies beneath the wheeled carriage along their respective longitudinal centerlines in rearwardly offset side-by-side relation such that the trailing gangs are coplanar with one another whereas the lead gangs lie in rearwardly offset parallel overlapped relation.

The inboard section of the lead gang that forms the portion of the rear disc subassembly that overlaps the adjacent end of the corresponding gang in the front disc subassembly is tapered to level the ridge and furrow created by a unique throw-back disc subsassembly moving ahead thereof in position to create a ridge and furrow in its path. This tapered conformation has the incidental, but nonetheless significant, advantage of riding the upslope of a concave contour without penetrating the soil appreciably deeper than the full-sized discs that follow. The front and rear disc subassemblies are dissimilar in that the inboard end of the lead gang in the rear subassembly is tapered as mentioned above while the corresponding gang in the front subassembly is not.

Mounted outboard of the front discs of the lead gang in the front disc subassembly are one or more adjustable throw-back discs positioned and adapted to intercept the ridge thrown up by these lead gang discs and return it to a location where it will be engaged by the discs of the tapered end of the lead gang in the rear gang subassembly that will function as previously noted to level the ridge and fill the furrow thus presenting a partially tilled but essentially level ground condition to the discs of the rear gang in this same subassembly.

By merely arranging the disc subassemblies in a rearwardly offset side-by-side relation such that the trailing gangs assume a coplanar relation while the lead gangs lie parallel to one another, the extent to which the widely spaced gang ends exceed the response of the closely spaced gang ends to a change in the altitude or tilt of the subassembly to and fro about a transverse axis by a factor of two; however, this is not enough. In addition, the carriage wheels supporting the two disc subassemblies are relocated such that both occupy essentially the same location relative to the leading and trailing gangs with which they are associated. Moreover, the carriage wheels no longer turn about axes lying in coplanar relation with the bisectors of the angle separating the lead and trailing gangs of a given disc subassembly, but instead, they are both displaced rearwardly of the latter.

Probably the single most significant feature of the instant disc-type ground tillage implement is the pivot link interconnecting the subframes of the two disc subassemblies that permit them to articulate relative to one another and the carriage frame while, at the same time, counteracting any tendency for the forwardmost discs of each gang to dig in deeper than those at the other end. In other words, as the front disc of the leading gang in the front disc subassembly attempts to dig into the ground more deeply than the other discs thereof, the linkage responds by trying to force the rear disc in the lead gang of the rear subassembly down into the ground when its normal tendency is to rise up. The net result is a set-off or stalemate in which each of the four gangs tends to stay level.

It is, therefore, the principal object of the present invention to provide a novel and improved disc-type ground tillage implement.

A second objective is the provision of a device of the type aforementioned that readily responds and adapts itself to difficult ground contours.

Another object of the within-described invention is to provide a ground tillage implement that efficiently and effectively turns all the soil in the path thereof without displacing same in a manner to change previously established ground contours.

Still another object of the invention herein disclosed and claimed is the provision of a disc-type multiple-gang tillage implement wherein the individual gangs are operatively associated with one another and with the carriage frame so as to achieve substantially uniform penetration of each disc regardless of depth or the contour of the ground being plowed.

An additional objective is the provision of a multiple-gang disc plow wherein the wheels are arranged so as to occupy the same relationship to their respective offset gangs.

Further objects of the invention forming the subject matter hereof are to provide a disc-type tillage implement that is rugged, versatile, simple to operate, readily adaptable to different working conditions, easy to maintain and trouble-free.

Other objects will be in part apparent and in part pointed out specifically hereinafter in connection with the description of the drawings that follows, and in which:

FIG. 1 is a perspective view looking down and to the left upon a tractor towing the disc-type ground tillage implement of the present invention;

FIG. 2 is a top plan view of the implement alone;

FIG. 3 is a right side elevation of the implement and tractor showing the unit in operative position with the carriage wheels retracted;

FIG. 5 is a rear elevation showing the disc subassemblies in the horizontal attitude they occupy when traversing level ground;

FIG. 6 is a rear elevation similar to FIG. 5 except that the disc subassemblies are tilted toward one another in the attitude they would assume when plowing a concave contour;

FIG. 11 is a fragmentary section to a greatly enlarged scale taken along line 11—11 of FIG. 2 showing the depth control adjustment subassembly;

FIG. 12 is a fragmentary section taken along line 12—12 of FIG. 2 to a larger scale than the latter but smaller than that of FIG. 11 showing the carriage-wheel retraction subassembly;

FIG. 13 is a diagram showing the pattern of dirt thrown up by the inboard discs of the lead gang in the front disc subassembly;

FIG. 14 is a section related to FIG. 13 showing the furrows cut by the aforementioned discs as well as the contour of the plowed ground left therebehind;

FIG. 15 is a diagram similar to FIG. 13 related thereto and to FIG. 14 showing the throw-back disc subassembly and its action on the ridge produced by the discs of FIG. 13;

FIG. 16 is a section related to the preceding FIGS. 13-15 showing the furrows and contour of the plowed ground after the throw-back disc subassembly has passed thereover;

Figure 7:
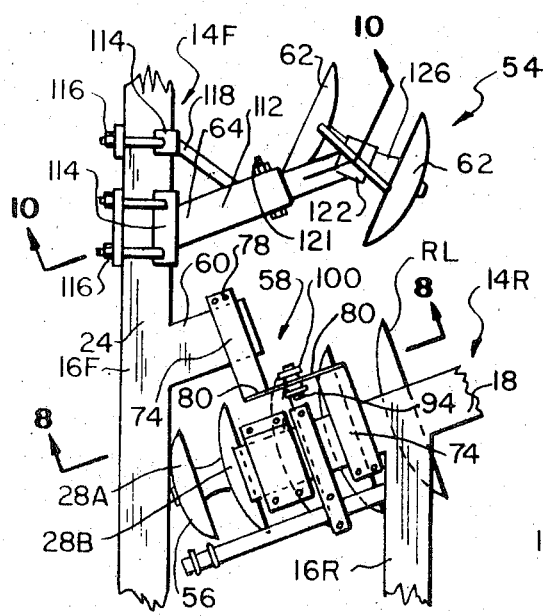
FIG. 7 is a fragmentary detail to an enlarged scale showing the adjustable throw-back disc subassembly in relation to the inboard end of the lead gang of the rear disc subassembly.

FIG. 17 is a diagram, again related to the preceding FIGS. 13-16 showing the inboard end of the lead gang in the rear disc subassembly in its relation to the throw-back disc subassembly and the inboard end of the lead gang in the front disc subassembly; and, FIG. 18 is a section much like FIGS. 14 and 16 related to FIGS. 13-17 showing the furrow pattern and ground contour after both lead gangs have passed thereover but before either of the trailing gangs have done so.

Referring next to the drawings for a detailed description of the present invention and, initially, to FIGS. 1, 2 and 3 for this purpose, reference numeral 10 has been chosen to represent the disc-type tillage implement in its entirety while numeral 12 similarly designates the wheeled carriage thereof and numerals 14F and 14R the front and rear disc-subassemblies, respectively, hingedly suspended from the latter. Each disc subassembly has its own subframe, the one for the front disc subassembly having been designated 16F while the other carries numeral 16R. These subframes, while similar, are not identical as will appear presently. Both, however, have front and rear transverse members 18 and 20, respectively, arranged in divergent acute angularly disposed relation to one another maintained by longitudinally extending parallel members 22 and 24 connected therebetween. Each of the angularly disposed subframe elements 18 and 20 carry conventional disc gangs suspended therebeneath. The lead gang on the front disc subassembly 14F will be designated by reference character FL while the corresponding gang in the rear subassembly will carry an analogous reference character RL. Similarly, the trailing gangs of these same subassemblies will be referred to by reference characters FT and RT to denote "front trailing" and "rear trailing," respectively.

The particular construction of these gangs forms no part of the present invention as each is conventional and consists of an axle 26 upon which a plurality of concave discs 28 are rotatably mounted and held in fixed-spaced relation by spacers 30 located therebetween. Suitable mounting brackets 32 suspend the gang from the subframe element thereabove. In the particular form illustrated, the rear outboard disc 28M of trailing gang RT of the rear disc subassembly is shown notched. Also, in accordance with the well-established practice, an auxiliary frame 34 is attached to the gang-carrying elements 18 and 20 of the subframes 16 to carry scrapers 36 (FIG. 1) that are positioned and adapted to scrape the mud off of the concave face of the discs.

The wheeled carriage 12 includes a main frame 36 with a tongue subassembly 38 at the forward end thereof adapted for attachment to the drawbar 40 (FIG. 3) of a tractor 42. This tongue subassembly is pivotally attached to the forward end of the main frame and it also operatively connects to a leveling adjustment mechanism 44 by means of an arm 46, all of which is shown most clearly in FIG. 11 to which specific reference will be made later.

Dual wheel sets 48 are journalled for rotation about rearwardly offset parallel axes that are positioned on opposite sides of the longitudinal centerline of the main carriage frame. The location of these carriage wheels relative to the disc-subassembly subframes 16F and 16R is significant and will be set forth in detail in connection with FIG. 4 to follow.

Both sets of dual wheels 48 are connected to a common depth control subassembly that has been indicated in a general way by numeral 50 and which will be described presently in connection with FIG. 12. The latter subassembly is powered by a hydraulic servo-motor 52 supplied with fluid under pressure from the tractor's hydraulic system (not shown). It also is operatively linked to the level adjustment which has previously been referred to in a general way by reference numeral 44.

The next of the important features is the adjustable throw-back disc' subassembly that has been broadly referred to by reference numeral 54 and which forms the subject matter of FIGS. 7 and 9 to which detailed reference will be made presently. These throw-back discs cooperate with the extended and tapered inboard end 56 of the lead gang RL to reproduce a pre-existing level condition after the plow has passed thereover. This same tapered extension 56 functions independently of the throw-back subassembly to insure a reasonably uniform depth of disc penetration when plowing concave contours.

Last, but by no means least, is the link subassembly that has been indicated in a general way by reference numeral 58 and which operatively interconnects the subframes 16F and 16R of the disc-subassemblies 14 in a manner to offset the normal tendency of the front discs of a gang to dig in deeper than the rear ones. This important feature has been revealed in FIGS. 7, 8 and 9 to which detailed reference will be made in due course.

Next, with particular reference to FIG. 4, it will be seen that subframe 16F differs from subframe 16R in that frame member 24M of the former has a stub element 60 projecting laterally therefrom in spaced substantially parallel relation to front angularly disposed frame members 18. Stub element 60 is not located midway between the front frame elements, but rather, is displaced rearwardly toward the one on the rear subframe 16R. This stub receives one end of pivot link subassembly 58, the other end of which is connected directly to front frame member 18 of the rear subframe as shown.

Subframe 16F also mounts the throwback disc subassembly 54 which is located ahead of the link subassembly 58 and generally about midway between the front frame elements 18. As will be shown presently, the throw-back discs 62 are adjustably mounted in the bracket 64 that fastens them to the front subframe, however, at present it should be noted that the path traveled by those discs lies well beyond that plowed by the lead gang FL of the front disc subassembly 14F. On the other hand, the inboard end 56 of lead gang RL of the rear subframe overlaps the furrows plowed by the inboard end of the lead gang FL of the front disc subassembly. The reason for this arrangement will be explained in detail as the diagrams of FIGS. 13–18, inclusive, are described.

Figures 8, 9:
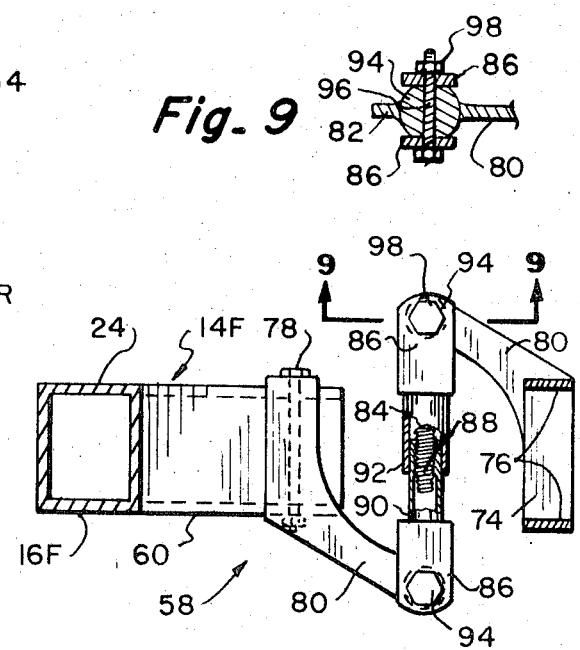
FIG. 8 is a further enlarged section taken along line 8—8 of FIG. 7 showing the adjustable pivotal link operatively interconnecting the front and rear disc subassemblies.
FIG. 9 is a fragmentary section taken along line 9—9 of FIG. 8 to the same scale as the latter.

FIG. 7 reveals more clearly than any other figure the fact that the discs making up the overlapping inboard end 56 of lead gang RL of the rear disc subassembly are of successively smaller diameter. The primary purpose for this tapered gang configuration is to level the ridge and corresponding furrow created by the inboard end of the lead gang of the front gang subassembly resulting from the break in the front and rear gang subassemblies.

Again in connection with FIG. 4, it will be noted that while the tapered inboard end 56 of the lead gang of the rear disc subassembly overlaps the area plowed by the inboard end of the lead gang in the front subassembly as mentioned above, the outboard end of the latter gang bears the same relation to the outboard end of the trailing gang FT therebehind as lead gang RL bears to its trailing gang RT. In other words, the relationship of the lead and trailing gangs in each disc subassembly remains essentially the same and it is the relationship between the two lead gangs that is different. The only significant difference that exists between the lead and trailing gangs of the two disc subassemblies is that the inboard end of the lead gang RL of the rear disc subassembly is tapered, whereas the corresponding (outboard) end of the lead gang FL on the front disc subassembly is not. One other difference exists and that is that trailing gang FT of the front disc subassembly carries no notched disc 28M as does trailing gang RT, however, this is of little significance.

Both FIGS. 2 and 4 reveal the fact that the dual carriage wheels 48 are journalled for rotation about axes which move in perpendicular relation to the hinge axes of the subframes as the wheels are retracted and extended but, at any given position, the relationship between one set of wheels and the subframe associated therewith is the same as that of the other set of wheels and its subframe. Looking at this relationship another way, while the wheels depend from the main carriage frame, they are located so as to occupy the same positions relative to the gangs of the subframes they underlie. Thus, regardless of the position of the dual wheels, both of which raise and lower together, their respective axes of rotation are always equal distances in front of their trailing gang and behind their lead gang. This staggered relation of the wheels relative to the main carriage frame insures that the gangs of both disc subassemblies will respond in the same way as the unit moves over the ground, a condition which would not exist if the carriage wheels were mounted for rotation about a common transverse axis as is common in the prior art disc-type tillage implements.

These same two figures show quite clearly that the rear gangs FT and RT have their axes of rotation arranged in coplanar relation while those of the front gangs FL and RL occupy a rearwardly offset parallel relation to one another. The attitude or angled relation of the several gangs relative to the direction in which the implement is being pulled is identical to that of the conventional disc-type plows and, for this reason, it requires no explanation. The same is, of course, true of the arrangement of the discs in the lead gang relative to those in the trailing gang of the same disc subassembly, it being intended that the latter plow away the ridges left between the furrows dug by the former and to return the tilled soil to its original untilled location.

Looking next at FIGS. 5 and 6, the details of the hinged connection between the subframes 16 and the main carriage frame 36 will be explored. Looking down on the carriage frame as in FIGS. 2 and 4, it will be seen to have an irregular five-sided polygonal shape with transversely spaced parallel sideframe elements 66 forming a part thereof that lie perpendicular to the axes of carriage wheel rotation while paralleling the direction of carriage movement. A pair of coaxially aligned hinge pins 68 extend through angularly disposed elements 18 and 20 of each subframe 16 along the longitudinal axis at which the disc subassembly of which it forms a part will hang essentially level. These hinge pins have their opposite ends retained for pivotal movement within spaced ears 70 depending from the underside of sideframe elements 66 as shown. As thus hingedly suspended beneath the carriage frame 36, the disc-subassemblies 16 are both free to tilt relative thereto from a level position like that shown in FIG. 5 where the axles 26 of the rear gangs FT and RT are essentially colinear either inwardly as in FIG. 6 or outwardly to conform with whatever ground contour that is being tilled. Note in FIG. 2 that the subframes 16 have their rear elements 20 spaced forwardly of the rear carriage frame element 72 so that the disc subassemblies can tilt outwardly and their adjacent ends can rise up into the open central portion of carriage frame 36 a substantial distance sufficient to accommodate most concave contours likely to be encountered in normal use.

Link subassembly 58 is most clearly revealed in FIGS. 7, 8 and 9 to which detailed reference will now be made along with FIGS. 1, 2, 4 and 6 which best disclose the overall operative relationship between the disc subassemblies. As has already been alluded to previously, the front or lead end of a disc gang has a pronounced tendency to dig into the ground a good deal deeper than the rear or trailing end. This results in non-uniform penetration and the resulting uneven tillage. In the instant implement, on the other hand, link subassembly 58 shown in FIGS. 1, 2, 6, 7 and 8, operatively interconnecting the subframes 16R and 16F of the front and rear disc subassemblies 14, has the effect of counteracting this condition. In FIGS. 2 and 4, for example, as the inboard or lead end of lead gang FL of the front disc subassembly 14F digs in and tends to rotate the latter clockwise as in FIG. 6, it will tend to be restored to the level condition of FIG. 5 due to exactly the same thing happening to the rear disc subassembly 14R which results in tapered inboard end 56 of its lead gang RL being raised up and acting through link 58 to lift the inboard edge of the front subassembly back up where it belongs. Conversely, as the inboard end of the rear disc subassembly tries to rise out of the ground under the aforementioned conditons, the clockwise thrust of the front subassembly will tend to restore it, also, to the level condition of FIG. 5. Essentially, therefore, by linking the front and rear disc subassemblies together by means of link 58, we take advantage of two offsetting counter-rotational forces to restore the desired balanced or equilibrium position of FIG. 5.

Stub arm 60 depending from sideframe member 24 of front subframe 16F parallels front angularly disposed member 18 of rear subframe 16R in spaced relation forwardly thereof as shown in FIGS. 1, 2, 4 and 7. A pair of mounting brackets 74 with bifurcated ends 76 slip over the rectangular frame members 60 and 18 and are adjustably fastened thereto by bolts 78, so as to lie in spaced essentially parallel relation to one another and with their adjacent ends in coplanar relation. Depending from the adjacent end of each mounting bracket is a generally L-shaped arm 80 having a ball socket 82 at the end thereof that is most clearly revealed in FIG. 9. In the particular arrangement illustrated in FIG. 8, the front or lefthand L-shaped arm 80 depending from the bracket bolted to stub element 60 has its ball socket at the bottom, whereas, the rear or righthand arm is slightly modified to place its socket at the top.

The adjustable link 84 interconnecting the two sockets 82 arranged one above the other includes a pair of U-shaped end portions 86 connected together for adjustable telescopic movement by a screw 88 depending from one such end section and an internally threaded tube 90 depending from the other. The portion carrying the screw also includes a sleeve 92 adapted to telescope down over tube 90 as shown. Bridging the gap between the spaced ears of each U-shaped end portion 86 is a ball member 94 with a bolt 96 therethrough having a nut 98 threaded on the end. The ball 96 mounts inside socket 82 for relative universal movement, all of which is most clearly revealed in FIG. 9.

With the linkage 58 just described, the subframes 16F and 16R are free to tilt about their respective longitudinally extending axes and open a gap therebetween while remaining rigidly interconnected to a degree where they cannot move independently, but instead, must move in unison. The ball and socket connections accommodate the relative tiltable movement between the two subframes.

Referring next to FIGS. 7, 10 and 13–18, inclusive, the function and construction of the throw-back assembly will be set forth. Looking first at FIGS. 13 and 14, it will be seen that what will be denominated here as the "rooster tails" of dirt 102 thrown up by each of the discs 28 in the lead gang FL except the forwardmost one, ricochet off the tail immediately ahead thereof (cross-hatched area in FIG. 14) and are thus deflected back to some degree; whereas, the corresponding rooster tail 102M thrown up by the forwardmost disc remains undeflected and, as a result, is thrown farther out to the side of the gang as shown. The net result is as illustrated in FIG. 14 where each disc of the gang plows its own furrow 104 and the dirt removed by all but the first falls back to create a blanket 106 of essentially uniform thickness. The forwardmost disc, on the other hand, builds up a ridge 108 therebeyond due to the fact that the rooster tail 102M it throws up goes undeflected. Note also that the ridge 108 thus produced is thrown farther out to one side of the disc than the dirt piled alongside the furrows by the other discs, again for the same reason.

Now, before any oppositely inclined trailing gang RT or FT can come along and shift ridge 108 back toward the gang (FL) that created same, the lead gang RL of the rear disc subassembly (FIG. 17) would ordinarily come along and compound the problem by moving ridge 108 even farther out to the right as viewed in FIG. 14. If this were allowed to happen, a significant lateral displacement of the plowed soil would occur in this area resulting in a series of unwanted troughs and ridges that destroy the carefully developed ground contours.

To overcome this problem, the throw-back subassembly 54 is interposed between the adjacent ends of the lead gangs FL and RL positioned to intercept ridge 108 prior to its being engaged by gang RL. The inclination of the discs 62 of the throw-back subassembly is opposite to that of the lead gangs and they function, therefore, to plow away the ridge 108 and move it back to the left into the path of the tapered overlapping end 56 of gang RL as shown most clearly in FIGS. 15 and 16. Note especially in FIG. 16 that the throw-back discs do not penetrate the ground, but instead, remain essentially at original ground level so as to merely remove the ridge 108 and clear the unplowed ground preparatory to the pass made by the full-sized discs of gang RL following along therebehind.

Having removed ridge 108 with the throw-back discs 62, they cooperate to create a second ridge 110 displaced to the left of the first and located directly in the path of the reduced diameter discs 28A and 28B that define the tapered end 56 of gang RL, all of which is shown in FIGS. 15, 16 and 17. Finally, as the smaller discs 28A and 28B engage ridge 110, they cut the top of it off and move it, once again, back to the right thus leaving the blanket of tilled soil 106 having an essentially uniform depth as shown in FIG. 18. More specifically, the larger of the two reduced diameter discs 28B defining the tapered end 56 of gang RL throws the loose soil in ridge 110 into the furrow dug by the rearmost full size disc in said gang. The smaller of the two discs 28A throws just enough loose soil to cover the furrow of the middle sized disc 28B without leaving a furrow of its own of any consequence.

Figure 10:
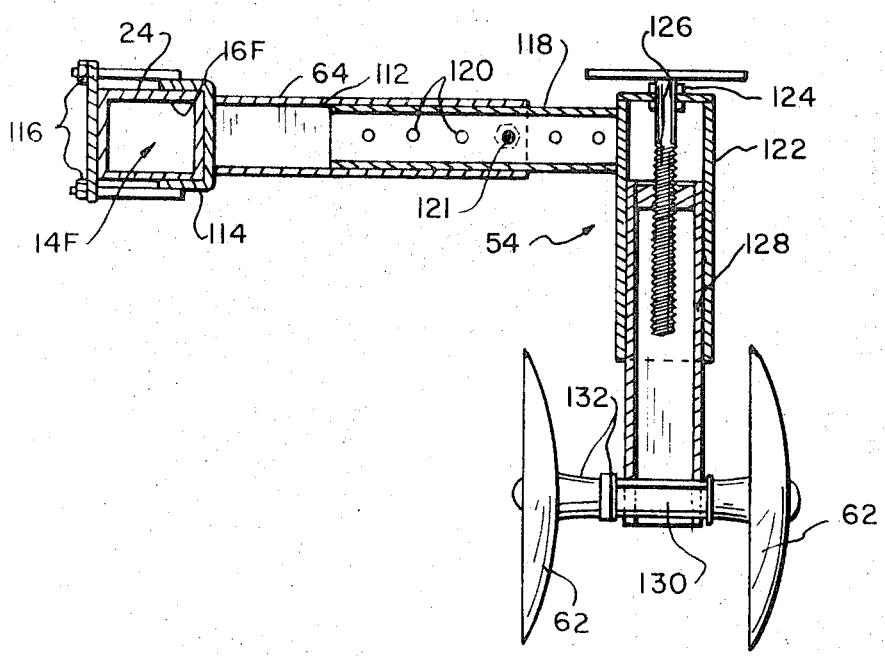
FIG. 10 is an enlarged section to the same scale as FIG. 8 showing the adjustable throw-back disc subassembly.

Bearing this in mind, if we return once again to FIG. 7, and also to FIG. 10, it can be seen that a hollow arm 112 of rectangular cross-section is fastened to frame element 24 of the front subframe 16F for longitudinal movement therealong by means of channel-shaped bracket 114 and U-bolt assemblies 116. In the particular form illustrated, an angle brace 118 extends forwardly from arm 112 and is similarly adjustably fastened to the subframe element 24 by a similar bracket and U-bolt assembly. Arm 112 parallels stub 60 depending from the same sideframe element 24 of subframe 16F in the particular form illustrated but it needn't be so situated. It must, however, be located such that it will carry the throw-back discs between the lead gangs of each disc subassembly as shown most clearly in FIGS. 2, 3 and 4. FIG. 3 also shows the throw-back discs 62 to be smaller than the full size gang discs 28 in addition to being raised up a good deal higher so as to remain at or near ground level.

Telescoped into arm 112 is a smaller rectangular arm extension 118 suitably apertured at spaced intervals 120 to receive latch pin 121 that enters an aligned pair of apertures (not shown) in the arm 112. The foregoing elements cooperate with one another in the well known manner to produce an adjustable length arm subassembly to the outboard end of which is fastened an upright tube 122, also of rectangular cross-section. The top of this upright tube is capped and provided with a collar 124 within which is journalled a jack-screw 126. The jack-screw is threaded into a nut 126 plugging the upper end of inner tube 128 that telescopes up into tube 122. The lower extremity of the latter tube carries stubshaft 130 upon the ends of which throw-back discs 62 are journalled. Suitable spacer subassemblies 132 keep the discs 62 from moving toward one another. Thus, not only are the throw-back discs 62 laterally adjustable, they are also vertically adjustable by means of the jackscrew 126. Lateral adjustment of the throw-back discs is necessary because the location of ridge 108 is a function of how fast the implement is being drawn through the field and it must, therefore, be repositioned accordingly. The vertical adjustment is also dependent upon the depth at which the implement is being worked as the throw-back discs are designed to merely clear away the loose soil in ridge 108 without plowing any uncut ground.

The depth control mechanism 50 (FIG. 12) and the level adjustment subassembly 38 (FIG. 11) are operatively interrelated and can best be described in connection with the foregoing figures together with FIGS. 1, 2 and 3 to which detailed reference will now be made. Before doing so, however, it will, perhaps, be helpful to explain the need for features such as those to be described.

It is of prime importance that the ground be tilled to essentially the same depth all the way from one side of the implement to the other because, if it isn't, the available moisture will be distributed unevenly and the resulting crops raised thereon will not attain a uniform growth as a result of this condition. This does not mean, however, that the lead and trailing gangs must all penetrate the soil to the same depth because, frankly, to minimize the "yaw effect" it is preferable to have the trailing gangs dig in deeper than the lead gangs. Looking at the forces at work on the implement as it plows through the ground in a bit more detail, a glance at FIG. 2 will reveal that the angulation of the gangs is such that the entire implement will tend to rotate counterclockwise due to the lead gangs forcing the front end to the right while the trailing gangs tend to turn the rear end to the left. These sidewise forces tending to turn the implement are not, however, equal because the lead gangs are plowing untilled ground while the trailing gangs are moving through plowed ground. Accordingly, to minimize the "yaw effect" tending to move the whole implement aside, it is best to load the trailing gangs heavier than the lead gangs. Also, since the working depth of the discs is adjustable depending upon the position of the carriage wheels relative to the frame yet the point of attachment to the tractor remains at essentially the same height above ground level, the tilt of the carriage frame and subassemblies supported thereby will vary accordingly and means must be provided for restoring same to the desired rearwardly tilted condition in which the trailing gangs are more heavily loaded than the lead ones thus minimizing the aforementioned "yaw effect."

Accordingly, in FIGS. 1, 2, 3 and 12, a large diameter tubular-shaft 134 can be seen journalled atop the main carriage frame adjacent the forward end thereof for rotational movement about a transverse axis defined by journal-forming mounting brackets 136. One end of a crank arm 138 (FIG. 12) is fastened to shaft 134 intermediate the ends thereof. The opposite end of this crank is pivotally connected to the clevis 140 on the end of piston rod 142 that emerges from the cylinder 144 of hydraulic servo-motor 52. A suitable bracket 146 fastens the servo-motor cylinder 144 to the carriage frame.

Servo-motor 52 is of the double-acting type having fittings 148 at each end thereof adapted to both receive and exhaust hydraulic fluid. Fluid lines 150 connected to the latter supply the servo-motor with fluid under pressure from the reservoir thereof on the tractor. The tractor is also equipped with the control mechanism operative to regulate the direction of fluid flow and to turn it on and off.

A pair of transversely extending shafts 152F and 152R are journalled for rotation behind and beneath shaft 134 in parallel relation to the latter within other journal-forming brackets 154 depending from the underside of the main carriage frame. Both of these shafts 152F and 152R carry relatively long rigid depth control members 156 that have axles 158 at the remote ends thereof upon which are journalled the dual wheels 48. These same shafts 152 are also provided with crank arms 160 which have their remote ends pivotally attached to the clevis 162 of adjustable rigid connecting links 164. Clevis 166 on the opposite end of each of these adjustable links 164 is pivotally fastened to crank arms 168 on the opposite extremities of shaft 134 as revealed most clearly in FIGS. 1 and 2.

Operation of servo-motor 52 in a direction to retract its piston rod 142 will act through crank arm 138 to turn shaft 134 counterclockwise as viewed in FIG. 12. When this occurs, the cranks 168 on the ends thereof will also rotate counterclockwise thus pulling upon links 164 connected thereto to turn crank arms 160 and shafts 152F and 152R connected thereto clockwise thereby raising element 156 and the wheels 48 carried on the end thereof from the full line extended position into the broken line retracted position of FIG. 12 or to any intermediate position therebetween.

In FIGS. 11 and 12, it will also be noted that shaft 134 carries an elongate apertured ear 170 depending therefrom that moves down in between the upstanding flanges of a U-shaped bracket 172 when the carriage wheels are in their full-line extended position of FIG. 12. A latch pin 174 passed through aligned apertures in the bracket and ear 170 releasably locks the wheeled carriage in its fully extended position where the gang subassemblies 14F and 14R are raised free of the ground and rendered inoperative.

Finally, with specific reference to FIGS. 1, 2, 3 and 11, the leveling adjustment linkage 44 will be explained. As previously mentioned, by tilting the carriage frame about the fulcrums defined by the wheels, it becomes possible to shift the load shared by the lead and trailing gangs, it being desirable to overload the trailing gangs because they are moving through loose soil and encounter less side thrust than the lead gangs which are penetrating the packed soil.

The crossframe member 176 at the front end of the main carriage frame 36 has a pair of transversely spaced tongues 178 depending therefrom to which yoke 180 is attached for pivotal movement about a transverse horizontally disposed axis. This yoke together with tongue 182 extending forwardly from its midpoint and rearwardly extending control arm 184 all constitute parts of the rigid unitary tongue subassembly 38.

The rear extremity of control arm 184 has a pair of extension plates 186 bolted or otherwise attached thereto that define a bifurcation adapted to accept the radial ears 188 on nut 190 of level adjustment subassembly 44 for pivotal movement therebetween about a transverse axis, all of which is clearly revealed in FIG. 11. Nut 190 is threaded onto the threaded section of bolt 192 which forms a part of the level adjustment subassembly and thus forms the operative link between the latter and the tongue subassembly 38.

The previously described main transverse crankshaft 134 carries a pair of crank-forming arms 194 projecting rearwardly therefrom in essentially coplanar relation to the extension plates 186 positioned therebeneath on the rear end of control arm 184. Crank-forming arms 194 also pivotally connect onto radially extending ears 196 depending from a collar 198 that is slidably mounted on the plain shank portion 200 of bolt 192. An upper compression spring 202 is mounted on shank 200 above collar 198 and below head 204. Sleeve 198 is free to slide up and down in split tubular spring housing 206 with its ears 196 projecting out through slots 208 in the sides thereof. This spring housing 206 comprises a lower collar 210 sized to accept the plain shank of bolt 192 for free slidable movement therein and ear-carrying upper collar 198 held in vertically spaced relation above the lower collar by a pair of curved plates 212 that cooperated to define slots 208 therebetween.

Bolt 192 is retained within spring housing 206 for limited axial movement relative thereto by a collar 214 encircling the shank thereof and fastened thereto by pin 216. Collar 214 abuts the lower end of upper ear-carrying collar 198 of the spring housing while forming the upper abutment for lower compression spring 218 that encircles shank 200 within said housing that rests atop lower collar 210.

Now, the broken line position of FIG. 11 corresponds to the full line position of FIG. 12 in that it represents a condition in which the carriage wheels are fully extended and the disc subassemblies 14 are raised free of the ground into a completely inoperative position. When this occurs, a crank-arms 194 depending from shaft 134 will be rotated clockwise into their broken line position thus raising the entire level adjustment subassembly 44 and tilting it forward slightly. Control arm 184 will assume the broken line position of FIG. 11, the net result of which is to tilt the main frame 36 rearwardly as the area illustrated lies between the fulcrums defined by the wheels and hitch and it will raise up therebetween. In so doing, however, the wheels have dropped down a considerably greater distance and the trailing gangs still clear the ground by several inches at least.

Now, when latch pin 174 is removed and shaft 134 rotated counterclockwise as viewed in FIG. 11 to lower the elements into the full line position shown, the entire carriage will return to a more nearly level condition while, at the same time, dropping down considerably due to the retraction of the carriage wheels. Such action, of course, places the disc-subassemblies down into their ground-engaging operative position.

By now it should be apparent that the compression springs, collars, radial pins and spring housing of the level adjustment subassembly 44 have very little to do with the loading of the front and rear gangs, the prime purpose and function of the latter being that of a shock-absorbent coupling. Thus, as far as the load distribution between the lead and trialing gangs is concerned, crank arms 194 could, just as well, be attached in fixed position to the shank of bolt 192.

The actual level adjustment, therefore, occurs at the threaded connection between control arm 184 and bolt 192. When bolt 192 is rotated in a direction to close the gap between bolt 190 and collar 198, the control arm will tilt forwardly toward the broken line position thus elevating the front end of the carriage and transferring a greater share of the total load to the trailing gangs. Conversely, widening this gap by reversing the direction in which bolt 192 is rotated, will result is a transfer of the load forwardly to the lead gangs by lessening the rearward tilt of the carriage frame.

What is claimed is:

1. In a disc-type ground tillage implement: a vertically adjustable wheeled carriage including a frame, attachment means on the front end of the frame for detachably connecting same to a towing vehicle, wheel-mounting means depending from the underside of the frame in transversely spaced relation behind the attachment means for movement relative thereto between a lowered and a raised position, and ground-engaging wheels journalled for rotation on the wheel-mounting means about transversely extending axes, said wheels and the mounting means therefor cooperating to define an undercarriage movable between a retracted position and an extended position; front and rear disc subassemblies hingedly attached to the underside of the carriage frame in rearwardly offset side-by-side relation to one another for independent tiltable movement into substantially coplanar relation with one another about transversely spaced parallel forwardly extending axes located intermediate their respective side margins, each of said disc subassemblies overlying one of the wheels in the extended position of said undercarriage and including a subframe having an opening therein located to accommodate movement of the wheel-mounting means associated with said wheel upon movement of said undercarriage between its retracted and extended positions, both of said subassemblies having a lead disc gang and a trailing disc gang supported therebeneath arranged in substantially coplanar divergent relation to one another and in oppositely inclined angular relation to the direction of carriage travel, the gangs of the two disc subassemblies being so located relative to one another and to their respective subframes that the trailing gangs are aligned and the lead gangs are disposed in rearwardly offset parallel relation to one another whenever said subassemblies lie in coplanar relation; and, rigid link means interposed between adjacent points on the subframes pivotally interconnecting said front and rear disc-subassemblies together for coordinated movement, said link means being operative in response to a force tending to tilt one of the disc subassemblies in one direction to tilt the other of said disc subassemblies in the opposite direction.

2. The ground tillage implement as set forth in claim 1 in which: the corresponding gangs in each disc subassembly are approximately the same length and arranged under their respective subframes in the same position; and, in which the wheels of the undercarriage are positioned between the lead and trailing gangs in each subassembly and occupy corresponding positions relative thereto in both extreme positions as well as all intermediate positions therebetween.

3. The ground tillage implement as set forth in claim 1 in which: each gang has an outboard end and an inboard end and the inboard end of the lead gang in the rear disc subassembly trails the outboard end thereof and overlaps the path traversed by the inboard end of the lead gang in the front disc subassembly; and, in which the portion of the inboard end of the lead gang in said rear disc subassembly that overlaps the inboard end of the lead gang in said front disc subassembly comprises spaced discs of progressively smaller diameter in the direction of said inboard end.

4. The ground tillage implement as set forth in claim 1 in which: the wheel-mounting means of the undercarriage comprises a pair of transversely extending shafts mounted for rotation in transversely shaped rearwardly offset parallel relation on the carriage frame, a pair of rigid depth control members depending from the shafts for limited angular movement therewith in parallel relation to one another, at least one wheel journalled for rotation on the end of each depth control members remote from the shaft, means operatively interconnecting the two shafts together for conjoint rotation cooperating therewith to define an elevating subassembly and means connected to said elevating subassembly operative upon actuation to rotate said shafts and the depth control members carried thereby in a direction and through an angle adapted to shift said wheels between their retracted and extended positions.

5. The ground tillage implement as set forth in claim 1 in which: the attachment means includes a forwardly extending rigid tongue pivotally connected intermediate its ends for tiltable movement about a transverse axis to the front end of the carriage frame, and adjustable means connected between said frame and tongue in spaced relation to its axis of pivotal movement operative upon actuation to vary the angle of inclination of the latter relative to the former.

6. The ground tillage implement as set forth in claim 1 in which: each disc gang has an inboard end and an outboard end; and in which a throw-back disc subassembly depends from the front disc subassembly, said throw-back disc subassembly including one or more concave discs positioned to intercept the ridge of loose soil plowed up by the inboard end of the lead gang of said front disc subassembly and transfer same back into the path of the inboard end of the lead gang of the rear disc subassembly.

7. The ground tillage implement as set forth in claim 2 in which: each disc subassembly includes an inboard end and an outboard end and the wheels are located approximately midway between the inboard and outboard ends of their respective disc subassemblies.

8. The ground tillage implement as set forth in claim 2 in which: the wheels are mounted for movement in a longitudinally extending vertical plane containing the axis of tiltable movement of the disc subassembly associated therewith upon movement of the undercarriage between its retracted and extended positions.

9. The ground tillage implement as set forth in claim 3 in which: the gangs each include a plurality of shallow cup-shaped circular discs arranged one behind the other in spaced parallel relation for rotation about a common axis and with their concave faces opening forwardly at an acute angle to the direction of travel, the concave faces of the discs in the lead gangs facing in one direction while those of the trailing gangs face in the opposite direction, the discs on the inboard end of the lead gang in the rear disc subassembly that overlap the path traversed by the inboard end of the lead gang in the front disc subassembly being graduated down in size in the direction of said inboard end, and all the remaining discs being of substantially the same size.

10. The ground tillage implement as set forth in claim 4 in which: the means operatively interconnecting the two shafts together for conjoint rotation comprises a third shaft journalled for rotation on the main frame in longitudinally spaced parallel relation to each of said two shafts, a crank arm depending from each of the two shafts and two transversely spaced crank arms depending from the third shaft arranged to define two longitudinally spaced parallel pairs thereof, and rigid links pivotally interconnecting the parallel crank arms of each pair.

11. The ground tillage implement as set forth in claim 5 in which: the adjustable means comprises an upstanding bolt carried by the main carriage frame for relative rotational movement, the lower end of said bolt being threadedly connected to the tongue so as to raise and lower same when rotated.

12. The ground tillage implement as set forth in claim 6 in which: the throw-back disc subassembly includes vertical adjustment means operative upon actuation to vary the height of the concave discs.

13. The ground tillage implement as set forth in claim 6 in which: the throw-back disc subassembly includes lateral adjustment means operative upon actuation to vary the position of the concave discs outboard of the front end of the lead gang in the front disc subassembly.

14. The ground tillage implement as set forth in claim 6 in which: the discs of the throw-back subassembly are set to ride at essentially the level of the uncut ground.

15. The ground tillage implement as set forth in claim 6 in which: the inboard end of the lead gang of the rear disc subassembly includes discs of successively smaller diameter in the direction of said inboard end positioned to intercept the ridge returned by the throw-back subassembly and operatively redeposit same in the furrow plowed by the inboard end of the lead gang of the front disc subassembly.

16. The ground tillage implement as set forth in claim 10 in which: the third shaft includes a third crank arm depending therefrom; and, in which the means for rotating the first two shafts comprises a double-acting hydraulic servo-motor with its cylinder pivotally attached to the main carriage frame and its piston rod connected to the third crank.

17. The ground tillage implement as set forth in claim 10 in which: the main carriage frame carries one part of a releasable latch mechanism and the third shaft carries a second part, said parts coacting in latched condition to hold the undercarriage in fully retracted position.

* * * * *